(12) United States Patent
     Chun

(10) Patent No.: US 9,367,590 B1
(45) Date of Patent: Jun. 14, 2016

(54) METHOD AND SYSTEM TO CLOUD-ENABLED LARGE-SCALED INTERNET DATA MINING AND DATA ANALYTICS

(71) Applicant: Connie Chun, Cupertino, CA (US)

(72) Inventor: Connie Chun, Cupertino, CA (US)

( * ) Notice: Subject to any disclaimer, the term of this patent is extended or adjusted under 35 U.S.C. 154(b) by 269 days.

(21) Appl. No.: 14/108,136

(22) Filed: Dec. 17, 2013

(51) Int. Cl.
    *G06F 17/30* (2006.01)
(52) U.S. Cl.
    CPC ................................ *G06F 17/30539* (2013.01)
(58) Field of Classification Search
    CPC ..................... G06F 17/30554; G06F 17/30539
    USPC ......................................................... 707/722
    See application file for complete search history.

(56) References Cited

U.S. PATENT DOCUMENTS

| 6,567,816 | B1 * | 5/2003 | Desai | G06F 17/30569 |
| 7,613,700 | B1 * | 11/2009 | Lobo | G06F 17/30943 |
| 8,311,974 | B2 * | 11/2012 | Gong | G06F 17/30563 |
| | | | | 707/602 |
| 8,725,775 | B2 * | 5/2014 | Gong | G06F 17/30572 |
| | | | | 707/798 |
| 9,292,577 | B2 * | 3/2016 | Friedlander | G06F 17/30528 |

* cited by examiner

*Primary Examiner* — Sheree Brown

(57) ABSTRACT

A method and procedure for large-scaled Internet data mining and data analytics for consumers over the cloud. The method describes an online market place which include an authoring tool generating computer scripts, executing the script to acquire data from URL, wherein the sequence of script instructions performs extraction and transformation of data, aggregating it into a dataset, publishing it for data consumer to pair with data analytics software programs in analyzing the dataset.

11 Claims, 3 Drawing Sheets

Sample script

```
#Define url for data mining
gethttpUrl=http://www.marketwatch.com/investing/index/DJIA;
# Identify the content to extract from the page
extractByContext=<tbody class="items">,</tbody>;
#transform the data into a row of data record
cleanTable;
suppressEmptyLines;
suppressExtraSpace;
#prepare to write a row of data record
buildStringFromTable;
#write file with timestamp
writefile=dowindex;
replace= <br>,;
```

Figure 3

METHOD AND SYSTEM TO CLOUD-ENABLED LARGE-SCALED INTERNET DATA MINING AND DATA ANALYTICS

BACKGROUND OF THE INVENTION

Internet is like a universe of data end point. The huge amount of unstructured data exists on the Internet has created huge opportunities for those who are leveraging on the value behind this data. Among those that promote this concepts are the search engines such as Google, Yahoo, and Bing. However, these search engines fall short in providing homogenous data set that can readily be used by data analytics software. Mining data on the Internet requires domain knowledge. A data miner must have the knowledge of the data that exists on the Internet and knowledge of the problem domain before apply data mining technique to obtain such data. Data are typically obtained by accessing WEB pages using URI, followed by some ETL procedures to convert WEB page source data into structured datasets. This process requires skill in the art of Internet programming in order to obtain the correct data. For time sensitive data, data sample must be obtained and aggregated over a long period of time. Such process requires additional discipline and data storage. Dataset acquired over time can then be used in conjunction with data-analytics software to produce analytic reports.

SUMMARY

The current invention introduces a novel method and procedure to offer a simple approach to this complicated problem. A cloud-based market place is created to provide service to three groups of participants using three interactive components, namely, the data producer, the data consumer, and the data analytics software provider. A data producer platform is a cloud-based platform for those who are familiar with the domain knowledge to aggregate data. It offers a simple script language for novice to mine domain specific data from the Internet. The script represents a single instance of the data being collected in a discrete time moment. The platform offers an automated method for a data producer to activate the script and define the time interval for data to be acquired. Each instance of the data is a row in a data table. Data acquired over time are aggregated as time-based rows to form a dataset, and is stored in a storage system such as network attached storage (NAS), local file store, or distributive system like HADOOP, where it will be ready for use by analytic software as input source for data analytics processing. The entire process forms a business model where data producers can use the system to harvest data from the Internet, and data analytic software providers can offer analytic algorithms as ready-made and ready-use software on known datasets as an offer in a marketplace, and make the result of the data analysis available for third parties, namely, data consumer. The social network aspect offers by this market place—collaboration among data producer, data analytics software provider, and data consumer—does not exist today. This invention will result in the creation of a new kind of social network that focuses on connecting the three roles of participants for one common purpose of providing data awareness and data analytics, bringing data analytics to consumers.

Other aspects and advantages of the invention will be apparent from the following description and the appended claims.

BRIEF DESCRIPTION OF DRAWINGS

FIG. 3 shows a sample script

DETAILED DESCRIPTION

Figure 1:
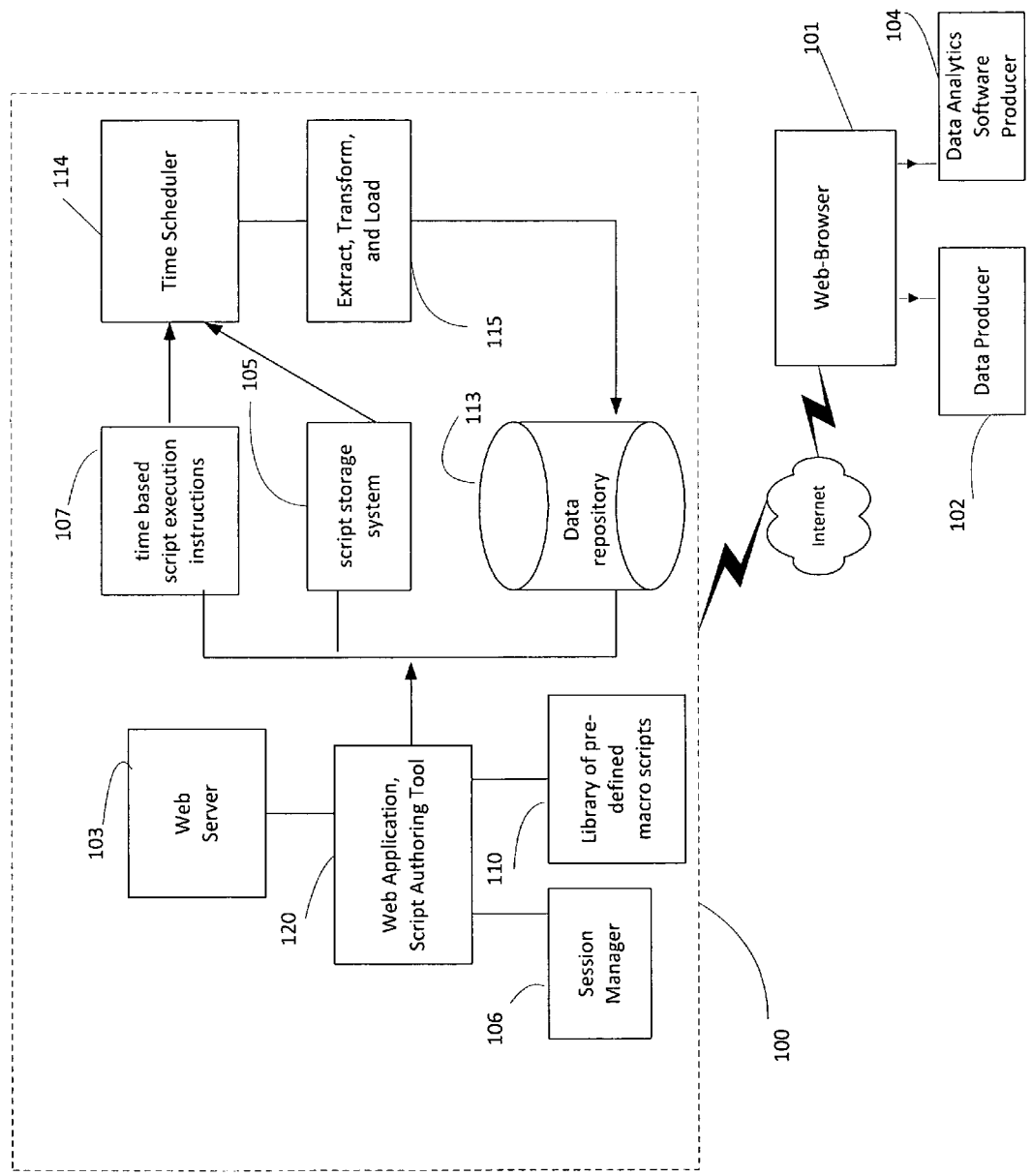
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provide a method, system, computer network, web-browser, web-server for automatically acquire dataset from the Internet identified by universal resource locator (URL). In one or more embodiments, the web-browser is being used as an authoring terminal for a person (the data producer) to author computer instructions in a script language to create a script. The script instructs a computer to acquire data identified by the URL and then extract data from it to form a record of data fields that are keyed by timestamps. The instruction will also instruct the computer to repeat such execution over some preset time intervals so that a set of data record will be aggregated over time to form a dataset. In one or more embodiments, the dataset is classified and cataloged with a summary description for data consumer to specify such dataset in conjunction with data analytics software programs. In one or more embodiments, a server program running in a web server will enable a data analytic software provider to upload data analytics software from a web browser. Such data analytics software will be cataloged and available for data consumer to select for use with datasets produced by data producer. Throughout this disclosure, the terms "data producer", and "script developer" may be used interchangeably depending on the context.

In one or more embodiments, during the script-authoring phase, instruction within a script is used to instruct the computer server to fetch data identified by an URL from the Internet. Retrieved data is extracted and transformed to form a data record keyed by the current timestamp. In one or more embodiments, during the activation phase; a time series dataset, containing multiple of data records, is created with repetitive execution of the script in predefined time intervals. In one or more embodiments, during the publishing phase, a summary description of the dataset is catalogued and associated with compatible analytics software programs. In one or more embodiments, during the harvesting phase, a data consumer will used a web browser to browse the catalogue and select a dataset and its compatible analytics software program to analyze the dataset and obtain the data analytics of the dataset.

FIG. 1 shows a diagram of a system (100) for script authoring in accordance with one or more embodiments. In one or more embodiments of the invention, one or more of the components shown in FIG. 1 may be omitted, repeated, and/or partitioned in a different manner. Accordingly, embodiments of the invention should not be considered limited to the specific arrangements of components shown in FIG. 1.

As shown in FIG. 1, the system (100) includes a web browser (101), a web server (103), a web-based script authoring tool (120), a server based script storage system (105), a web-based session to manage the script-authoring session (106), a data repository storing data sets (113), a time scheduler (114) that execute the script on preset time intervals (107), and extract/transform results into rows of time based data records (115). In one or more embodiments of the invention, the web browser (101) and the user may be a data producer (102) or a data analytics software provider (104). For example, the same person may author the script for dataset production and a provider of an analytics software program to analyze the dataset. In another embodiment of the invention, one may only author the script for dataset production (102) and another person is the provider of an analytics software program for the analysis of the dataset (104). Each of components shown in FIG. 1 is described below. One with ordinary skill in the art will appreciate that embodiments are not limited to the configuration shown in FIG. 1.

Figure 2:
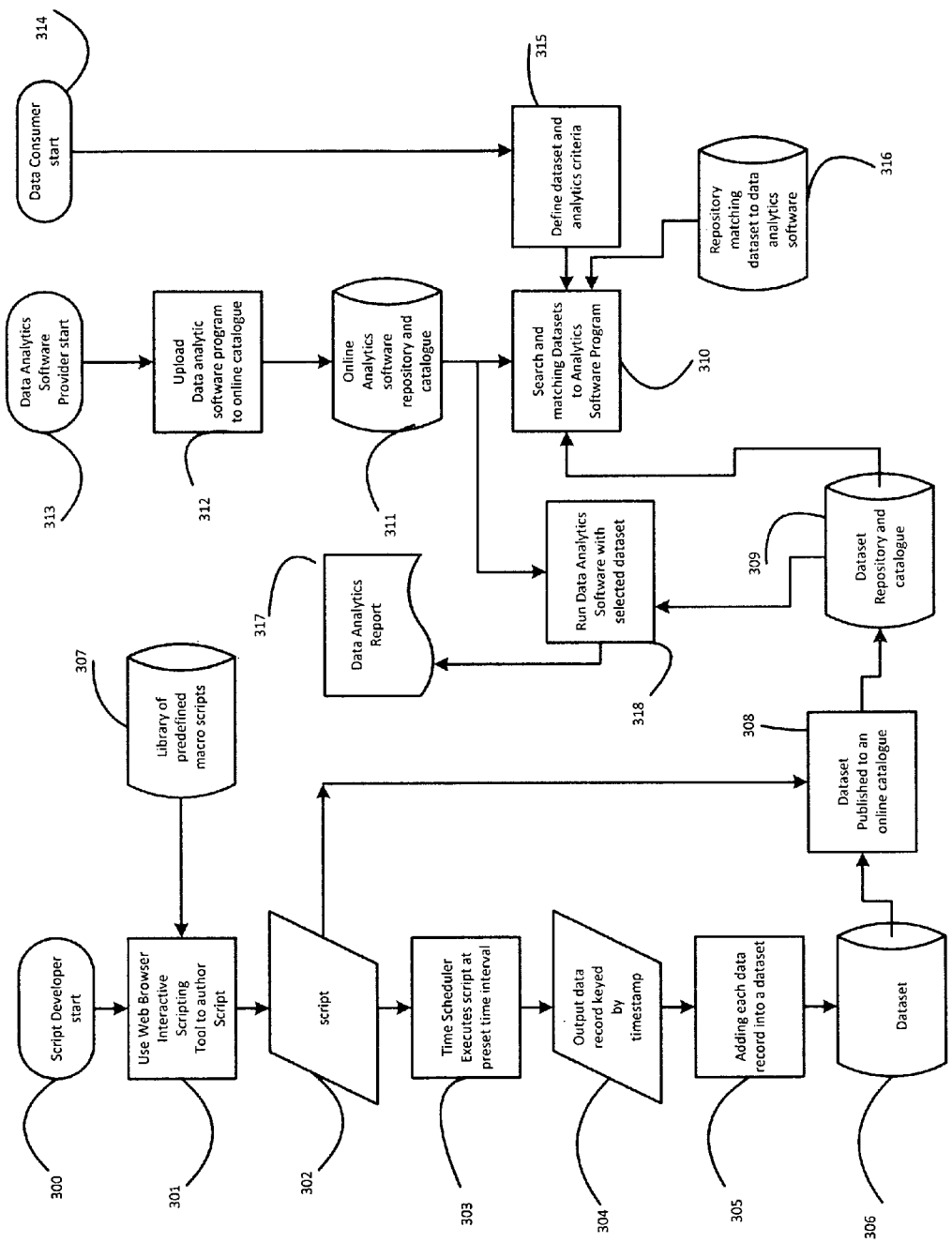
FIG. 2 shows a flowchart of a method according to aspects of the invention.

In one or more embodiments of the invention as shown in FIG. 2, the web based authoring tool (301) includes the reference to a library of pre-defined macro scripts (307) that is configured to ease the development of complicated script instructions. In one or more embodiments, there is a script-authoring module where a script developer (300) can interactively define procedures using a script language syntax (301). Specifically, particular data identified by the URL and instructions on how to extract and transform the data into a row of data record (304). The script-authoring module provides a widget for script testing (301). The script developer can use this widget to test all aspect of the script in an interactive session at any point of the script development. An example of the script is described in reference to FIG. 3.

In one or more embodiments, script instructions regarding time based execution of the script (303) are provided by the script as input (302) to the time scheduler (303) so that data (304) are automatically obtained and aggregate to form a dataset of many rows of data records (305). As shown in FIG. 1, the extracted reference datasets are stored in the repository (306) for use during a subsequent data analytics procedure.

In one or more embodiments of the invention as shown in FIG. 2, in addition to authoring the script instructions, the script catalogue program (308) is further configured to describe the content of the dataset. Specifically, the dataset catalogue module (308) receives summary description from the script instruction (302) during the publishing phase. In one or more embodiments, the dataset is matched with the algorithm specified by data analytics software program (311) so that the data consumer (314) can select data analytics by preset pair of datasets to data analytics software programs (316). The dataset catalogue module (309) presents a list of relevant dataset (310) according to the user's search criteria (315), and presents a list of data analytics programs (316) to the data consumer (314) to select from and submitting the request to the analytics execution engine (318) in order to analyze the selected dataset (317).

In one or more embodiments of the invention, a single row of data acquires by a script may be derived from different time instants. A script can be configured to capture partial data of a row as a one-time instance, while the remaining data fields will be captured at a latter time. For example, in an application where the stock price at market open is paired with the price at market close of the same trading day to form a record. Accordingly, each market open data fields corresponding to the market close data fields form one row of data for one trading day.

In one or more embodiments of the invention, the instruction provides by the script may consist of an upload instruction which define the data source from a file located at the computer. For example, the script instructs the data to be obtained from a local file system where the web-browser resides.

In one or more embodiments, the script may define a web-browser form for data entry using keyboard or cut and paste of contents from the web-browser's cut and paste buffer. Data is then uploaded to the web-server and aggregated into a dataset for eventual publication and make available for data consumer to use.

In one or more embodiments, the data repository is a persistent storage device (or set of devices) and is configured to receive working data from, and to deliver working data to the data analytics software program. The data repository may be a data store (e.g., a database, a file system, one or more data structures configured in a memory, some other medium for storing data, or any suitable combination thereof). The data repository may be a device internal to the web-server host. Alternatively, the data repository may be an external storage device operatively connected to a distributive file system such a HADOOP.

The authoring tool may further include an off-line authoring tool in the script developer's computer, where the resulting script could then be uploaded to the web-server host for execution. However, those skilled in the art will appreciate that implementations of various technologies described herein may be practiced in other computer system configurations known to those skilled in the art.

FIG. 2 depicts a flowchart of method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the methods depicted in FIG. 2 may be practiced using system (100) described with respect to FIG. 1 above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to implement an online marketplace for large scale data mining and data analytics in a collaborative online social network environment, comprising:

authoring automated scripts for computer to mine data from the Internet using Universal Resource Location (URL);

retrieving, in response to a fetch data instruction, data with context that enable extraction and transformation to form a row of data record;

automatically executing a script to acquire rows of data record;

repeating execution of the script according to a given rule;

aggregating a sequence of rows to form a dataset of a plurality of datasets that are provided by a plurality of data producers;

publishing the plurality of datasets, for subsequent selection by a plurality of data consumers, in a dataset catalogue, wherein the dataset catalogue comprises a summary description of each of the plurality of datasets and associated with at least one of a plurality of data analytics software programs;

presenting to a data;

generating, by a computer processor and from the plurality of datasets, a selected dataset by matching dataset properties to a user-defined context defined by a data consumer of the plurality of data consumers;

validating selection of the selected dataset based on a predetermined criterion;

defining data analytic algorithms of a plurality of data analytics software programs provided by a plurality of data analytics software providers;

defining a required input parameter to each of the plurality of data analytics software programs;

defining a data domain that is required as input to each of the data analytics algorithms;

uploading the plurality of data analytics software programs to data analytics software program repository;

publishing a purpose of each of the plurality of data analytics software programs in a data analytics software catalogue;

generating, by the computer processor and from the plurality of data analytics software programs, a matching data analytics software that is compatible with the dataset properties of the selected dataset;

executing the matching data analytics software program with the selected dataset to generate data analytics results for presenting to the data consumer;

matching criteria of analytics provided by the data consumer;

inspecting the dataset properties of the plurality of datasets in a dataset repository;

inspecting data analytics properties in the data analytics software program repository;

accepting input criteria based on the dataset properties of the plurality of datasets;

further accepting the input criteria base on the data analytics properties of the plurality of data analytics software programs;

generating, for including in the dataset catalogue, a pair of best matched dataset and data analytics software program by matching the dataset properties and the data analytics properties for similarities;

producing an output of the pair of best matched dataset and data analytics software program; and recommending the pair of best matched dataset and data analytics software program to the data consumer, wherein the plurality of data producers, the plurality of data consumers, and the plurality of data analytics software providers form the collaborative online social network environment.

2. The method of claim 1, further comprising:
obtaining, data source from local file system of a web-browser,
wherein the file is uploaded to the web-server for data repository to form the dataset.

3. The method of claim 1, further comprising:
selecting a data analytics software program that is compatible with the dataset from the data analytics software catalogue,
wherein the plurality of data analytics software programs are configured to produce results of different analytics algorithms.

4. The method of claim 1, further comprising:
selecting data analytics software programs based on the dataset properties of the dataset as defined in the script,
wherein properties of data fields within each row is compatible to the input criteria of the data analytics software programs.

5. The method of claim 1, further comprising:
selecting pre composed scripts from a macro script library.

6. The method of claim 1, further comprising:
including a repetitive rule for timely repeating the script in acquiring a time series of rows to form the dataset.

7. The method of claim 1, further comprising:
including procedures to match the dataset produced by the script with compatible data analytics software for a specific data analytics purpose.

8. The method of claim 1, further comprising:
using output of one analytics software program as input to another software program.

9. The method of claim 1, further comprising:
using a single computer to execute the dataset.

10. The method of claim 1, further comprising:
using a network of computer system in a distributive computer environment.

11. A system to support a market place of providing services to data producers, data consumers, and data analytics software providers, comprising:
a computer processor;
an instruction module executing on the computer processor and configured to:
receive a script authoring request from a user among the data producers;
generate, in response to the script authoring request, a script comprising a sequence of instructions instructing a server to obtain data from an URL or URI; and
aggregate the data into rows of a dataset for storing in some persistent storage comprising a plurality of datasets from the data producers;
publish the plurality of datasets, for subsequent selection by the data consumers, in a dataset catalogue, wherein the dataset catalogue comprises a summary description of each of the plurality of datasets and associated with at least one of a plurality of data analytics software programs,
generate, from the plurality of datasets, a selected dataset by matching dataset properties to a user-defined context defined by a data consumer; and
generate, from the plurality of data analytics software programs, a matching data analytic software program that is compatible with the dataset properties of the selected dataset;
a first web-server application configured to render the dataset catalogue to the data consumers;
a second web-server application configured to receive uploads from the data analytics software providers and store the plurality of data analytics software programs;
a third web-server application configured to:
store and render a data analytics software catalogue to the data consumers, wherein the data analytics software catalogue represents the plurality of data analytics software programs from the data analytics software providers;
match a data analytics software algorithm of the matching data analytic software program to the dataset properties of the selected dataset; and
validate compatibility of the selected dataset to the matching data analytics software program based on a pre-determined criterion; and
a repository configured to store the script, the plurality of datasets, the plurality of data analytics software programs, and an output from processing of the selected dataset by the selected data analytics software,
wherein the data producers, the data consumers, and the data analytics software providers form a collaborative online social network environment.

* * * * *